Jan. 25, 1955  B. BARÉNYI  2,700,571
FRAME STRUCTURE OF AUTOMOTIVE VEHICLES
Filed Feb. 18, 1952  2 Sheets-Sheet 1
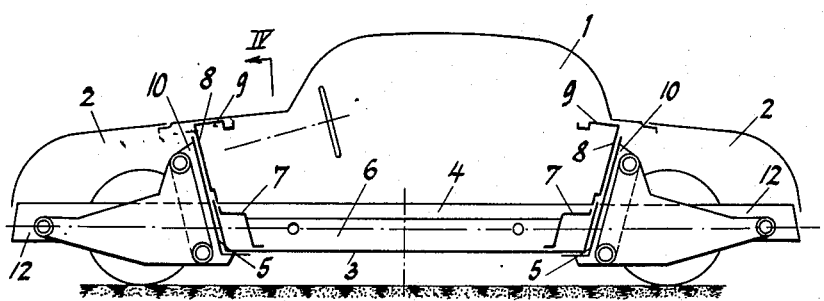
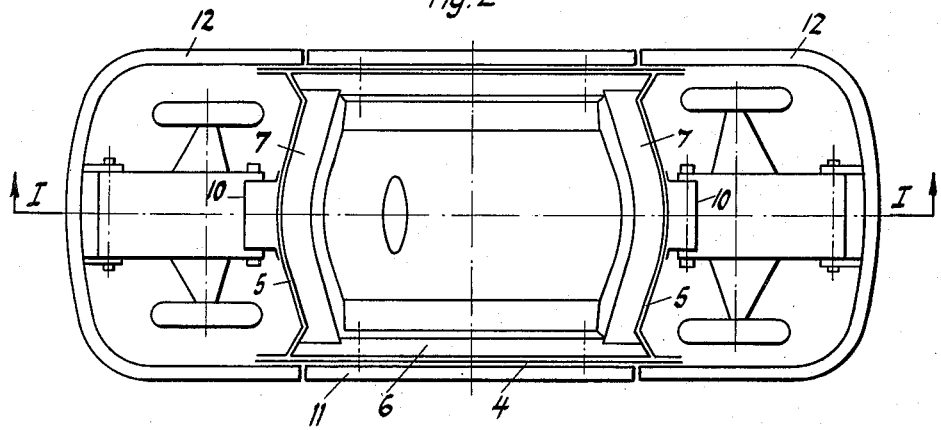
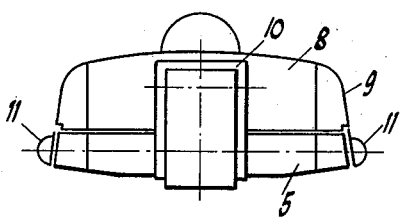
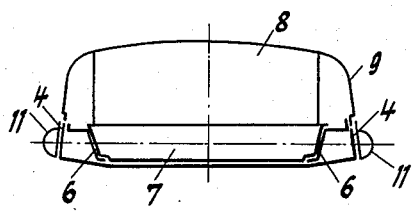
INVENTOR
Béla Barényi
By Deike and Padlon
ATTORNEYS Jan. 25, 1955   B. BARÉNYI   2,700,571
FRAME STRUCTURE OF AUTOMOTIVE VEHICLES
Filed Feb. 18, 1952   2 Sheets-Sheet 2

INVENTOR
BÉLA BARÉNYI
By Dicke and Padlon
ATTORNEYS

United States Patent Office

2,700,571
Patented Jan. 25, 1955

2,700,571

FRAME STRUCTURE OF AUTOMOTIVE VEHICLES

Béla Barényi, Stuttgart-Rohr, Germany, assignor to Daimler-Benz Aktiengesellschaft, Stuttgart-Unterturkheim, Germany Application February 18, 1952, Serial No. 272,076

Claims priority, application Germany February 17, 1951

10 Claims. (Cl. 296—28)

The present invention relates to middle sections or cells of automotive vehicles composed of a plurality of separately constructed sections or cells.

The principal object of the invention is to provide a combination floor and frame structure for separately built middle sections, which structure is of low weight and yet of great rigidity and which consists only of a relatively small number of parts.

Other objects of the invention will become apparent from the following description of the invention.

According to the invention the body and frame structure includes a sheet metal structure comprising a floor plate, the edge portions of which are bent upwards so as to form the rims of a substantially rectangular pan shaped floor panel, and a plurality of profiled sheet metal strips which are disposed inwardly of the upwardly bent rims and are connected thereto in such a way that box or tubularly shaped side and cross members are formed on the circumference of the floor panel.

It will be found expedient to give the front and rear rims of the pan shaped floor structure and especially the center portions of these rims a convexly projecting shape. The end portions of the front and rear rims may be slanted forwardly and rearwardly in such a way as to extend obliquely across the ends of the sheet metal side members to which they are suitably fastened, for instance by welding. There should be no sharp bends in the rims where their convex center portions and their slanting end portions merge.

It is also considered a feature of the present invention to provide a front and a rear sheet metal wall for the middle section of the vehicle, each of these walls comprising two sections angularly disposed relative to each other, one of these sections extending substantially longitudinally and the other one substantially vertically, the lower edge of the vertical section being fastened to the front and rear rim and the lower edges of the cowl shaped horizontal section being fastened to the side rims. The substantially vertical sections of the side walls may also wholly or partially be integral portions of the front and the rear rim.

Substantially vertically extending channel shaped sheet metal members which are rigidly fastened to the outer sides of the front and rear walls and or the front and rear rims serve as supports to which the two end sections of the vehicle are connected. Preferably the lower portions of these support members will extend around the front and rear edge of the floor plate and will be fastened to the bottom side of this floor plate. An advantage of support members of the described type is that the axles which are suspended in the vehicle end sections can be moved relatively closely to these support members. The channel shaped duct formed by fastening the two sides of the support members to the front and rear walls and/or rims can be utilized to advantage for cables, control rods and the like as well as for ducting air used for ventilating or heating the passenger compartment.

According to the present invention the floor structure extends laterally beyond the tread of the vehicle so as to obtain a large floor space for the middle section.

If the vehicle is equipped with a guard rail structure extending around the entire vehicle, the guard rail sections of the middle section of the vehicle will preferably consist of profiled sheet metal strips fastened to the side rims of the floor plate. U-shaped guard rail sections which surround each of the separate end sections of the vehicle will complete the annular guard rail structure. These U-shaped sections can either be fastened to the ends of the side rims or can be fastened solely to the end sections of the vehicle in which case the guard rail sections of the middle section of the vehicle preferably end up flush with the side rim ends and a space is provided between the U sections and the side sections of the guard rail.

Several embodiments of the present invention are described with reference to the accompanying schematic drawings of which:

Fig. 1 shows a vehicle composed of three individual sections in longitudinal sectional view taken along line I—I of Fig. 2, Fig. 2 is a plan view of the vehicle chassis, Fig. 3 is a front view of the middle section of the chassis shown in Fig. 2, the front end section of the vehicle being removed.

Fig. 4 is a cross sectional view taken along line IV—IV of Fig. 1,

Figure 7:
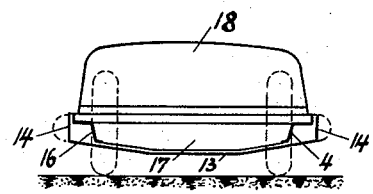
Fig. 7 is a schematic cross sectional view taken along line VII—VII of Fig. 5.

The vehicle shown in Figs. 1 to 4 is composed of 3 separately built vehicle sections or cells i. e. a middle section 1 and two end sections 2, the two end sections preferably being of equal size and similar outside appearance. The floor of the middle section 1 consists of a sheet metal plate 3. The floor plate 3 has preferably a substantially rectangular shape and its edge portions are bent upwards so as to form a substantially pan shaped floor structure having upwardly bent side rims 4 and upwardly bent front and rear rims 5, the rims 4 and 5 being connected with one another at their adjacent ends for instance by welding. The outer end portions of the front and rear rims 5 are preferably curved forwardly and rearwardly in such a way that the inside surfaces of their extreme end portions adjoin the inside surfaces of the forwardly and rearwardly extended side rim end portions. Profiled sheet metal strips 6 and 7 are so mounted inside the pan shaped floor structure that they and the rims of the plate structure form box shaped side and cross members which extend around the circumference of the floor structure. The strips 6 and 7 are preferably connected to the plate structure by welding.

Sheet metal walls consisting of substantially vertically extending sections 8 and substantially longitudinally extending cowl sections 9 are fastened to the plate structure, the lower edge portion of the section 8 being fastened to the rim 5 and the lower edges of the cowl section 9 being fastened to the side rims 4. On the outer surfaces of the rims 5 and the walls 8 box shaped sheet metal members 10 are fastened, to which members the respective vehicle end sections 2 will be connected. A profiled sheet metal strip 11 is fastened to each of the rims 4. Similarly, profiled U-shaped guard rails surround the two vehicle sections 2 so that the entire vehicle is surrounded by a continuous guard rail structure. The side sections 11 of this rail structure can consist of thin gage sheet metal and can, as shown in Fig. 2, be fastened by screws directly to the floor structure, whereas the ends of the U-shaped sections are fastened to the adjacent end portions of the rims 4 and 5. The side rails 11 can, however, also be welded to the rims 4 thereby increasing the rigidity of the floor structure. In this case the rails 11 will extend the entire length of the rims 4 and a small space will be provided between rail sections 11 and 12.

Figure 6:
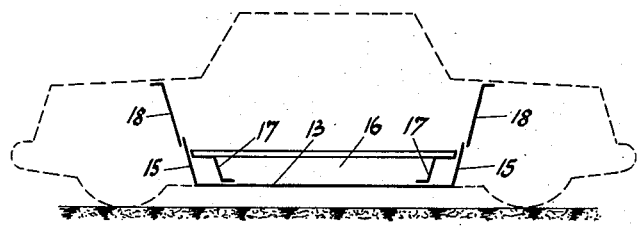
Fig. 6 is a schematic longitudinal sectional view taken along line VI—VI of Fig. 5
Figure 5:
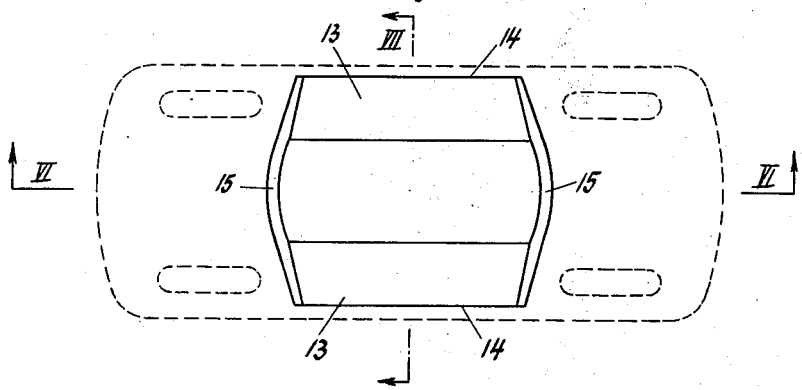
Fig. 5 is a schematic plan view of a middle section floor and frame structure, slightly different from the one shown in Figs. 1 to 4, and drawn within the outline of a vehicle.

In the Figs. 5 to 7 the reference numeral 13 designates the floor plate of the middle section of a vehicle composed of three separately built sections of cells. The edges of the plate 13 are bent upwards so as to form longitudinally extending side rims 14 and substantially transversely extending front and rear rims 15 of convexly projecting arcuate shape. Angle plate strips 16 and 17 are mounted within this pan shaped floor structure in such a way that longitudinally and transversely extending box shaped sheet metal members are formed on the circumference of the floor structure. The rims 15 are extended upwardly by fastening sheet metal walls 18 thereto.

What I claim is:

1. A middle section for automotive vehicles composed of a plurality of separately built sections including in combination a floor and frame structure comprising a substantially rectangular floor plate having its edge portions bent upwards so as to form a substantially pan shaped structure, a plurality of profiled sheet metal strips mounted inwardly of said pan shaped structure and connected to the bent up front, rear and side rims of said pan shaped structure so as to form hollow side and cross members extending along the sides of the floor structure, the center portions of said front and rear rims having an outwardly curved substantially arcuate shape and the end portions of the front rim being bent forwardly and those of the rear rim rearwardly so as to extend obliquely in front of the ends of said hollow side members, to which they are rigidly connected.

2. A middle section according to claim 1, wherein the ends of said side rims extend beyond said side members, the inner side of said extended side rim end portions abutting and being connected to the inner side of the extreme ends of said front and rear rims.

3. Middle section according to claim 2 wherein profiled guard rail side sections are attached to said side rims, said guard rails side sections forming together with two U-shaped guard rail end sections a guard rail structure extending around the entire vehicle.

4. Middle section according to claim 3, wherein the U-shaped guard rail end sections are fastened to said extended side rim end portions.

5. Middle section according to claim 3, wherein the guard rail side sections end up flush with the ends of the side rims, a space being provided between adjacent ends of said guard rail side sections and said U-shaped guard rail sections.

6. Middle section for automotive vehicles composed of a plurality of separately built sections including in combination a floor and frame structure comprising a substantially rectangular floor plate having its edge portions bent upwards so as to form a substantially pan shaped structure, a plurality of sheet metal strips mounted inwardly of said pan shaped structure and fastened to said bent up front, rear and side rims of said pan shaped structure so as to form hollow side and cross members extending along the sides of the floor structure, front and rear sheet metal walls attached to said floor structure, each of said walls comprising two sections angularly disposed relative to one another, one of said wall sections being cowl shaped and extending substantially longitudinally, the other one of said wall sections extending substantially vertically, the bottom portions of said vertically extending wall sections being fastened to said front and rear rims and the lower edges of the side portions of said cowl shaped sections being fastened to said side rims.

7. Middle section according to claim 6 wherein the substantially vertical wall sections have—when viewed in horizontal section—the same shape as the rim portions they are connected with and extend upwardly in the same direction as said rim portions.

8. Middle section according to claim 6, wherein a channel shaped sheet metal member is fastened to the outer sides of said forward wall and said front rim and another one of said channel members is fastened to the outer sides of said rear wall and said rear rim, said channel members being mounted with the open side of the vertically extending channel facing said walls.

9. Middle section according to claim 7 wherein said vertical sections are an integral portion of said front and rear rims.

10. Middle section according to claim 8, wherein the lower ends of said channel members extend around the transverse bottom edges of the floor structure and are fastened to the bottom side thereof.

References Cited in the file of this patent
UNITED STATES PATENTS

| | | |
|---|---|---|
| 2,092,507 | Haltenberger | Sept. 7, 1937 |
| 2,271,310 | Schafer | Jan. 27, 1942 |

FOREIGN PATENTS

| | | |
|---|---|---|
| 114,892 | Sweden | Sept. 11, 1945 |
| 525,792 | Great Britain | Sept. 4, 1940 |
| 601,189 | Germany | Aug. 10, 1934 |
| 852,494 | France | Oct. 30, 1939 |